Sept. 11, 1962
J. S. TODMAN
3,053,992
BI-STABLE CIRCUITS
Filed June 5, 1959
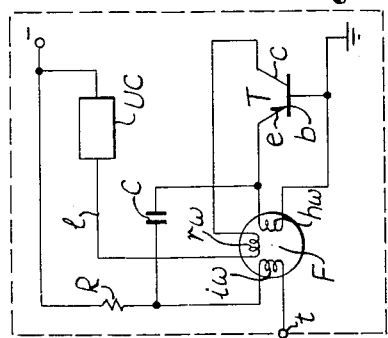
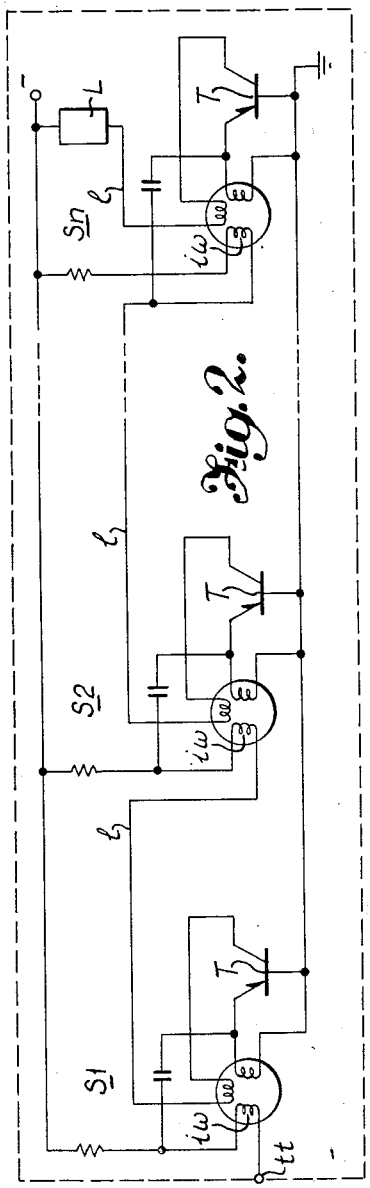
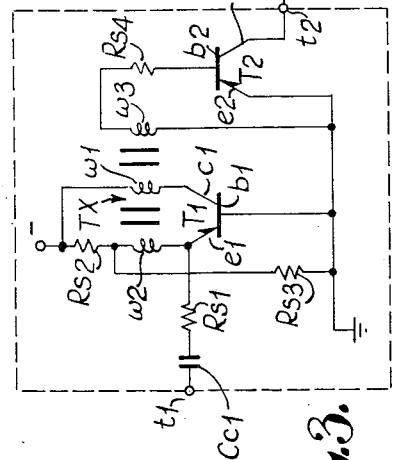
INVENTOR
JOHN STANLEY TODMAN
BY
ATTORNEYS United States Patent Office 3,053,992
Patented Sept. 11, 1962

3,053,992
BI-STABLE CIRCUITS
John Stanley Todman, Blackheath, London, England, assignor to Associated Electrical Industries (Woolwich) Limited, a British company
Filed June 5, 1959, Ser. No. 818,431
Claims priority, application Great Britain June 13, 1958
3 Claims. (Cl. 307—88)

This invention relates to electrically operable bi-stable circuits, that is, circuits having two stable states to which they can be operated alternately by successively applied operating pulses. Thus, if such a circuit is initially in one stable state it operates to change to its other stable state in response to an applied pulse and remains in this latter state until operated again by a further applied pulse, when it reverts to its original stable state, and so on for further applied pulses.

The present invention is more particularly concerned with such a bi-stable circuit from which effective output signals can be obtained in the form of pulses which occur during change-over of the circuit from one stable state to the other but only when such changeover is in a particular direction so that in effect the circuit provides only one output pulse for every two operating pulses applied to it.

The invention envisages a novel bi-stable circuit of this latter nature which employs a static magnetic element, having a core of ferrite or of some other ferro-magnetic material which exhibits a substantial rectangular hysteresis loop when subjected to a cycle of magnetisation such core being hereinafter identified as a square-loop core. Basically the operation of such a magnetic element is that, depending on the function being performed, its core is "set" to a condition of magnetic saturation in one direction of orientation by the application to a winding thereon of a bias or setting pulse of sufficient magnitude and appropriate polarity, and is subsequently "re-set" to a saturated magnetic condition in the opposite direction by the application to the same or another winding, perhaps in conjunction with an applied priming signal, by a resetting pulse of sufficient magnitude and appropriate polarity. The transition from one condition of magnetic saturation to the other (in either direction) is commonly known as "turnover" of the core.

According to the invention an electrically operable bi-stable circuit comprises a static magnetic element having a square-loop core, an input winding connected to receive operating pulses of setting polarity and magnitude (namely polarity and magnitude appropriate to effecting setting of the core of said element), and an inhibiting winding coupled to an electronic device which is connected also to receive said operating pulses in such manner as to tend to be rendered conductive thereby and on being so rendered conductive to produce an output pulse from the circuit, said inhibiting winding being effective to produce, on setting of the core, a pulse preventing conduction of the electronic device, and being connected in a main current path of the electronic device to receive current of re-setting polarity and magnitude for the core when this device conducts. Thus, with the core element initially in a re-set condition the receipt of an operating pulse by the circuit effects turnover of the core to set it, while at the same time tending to render the electronic device conductive. However, the setting of the core produces a pulse in the inhibiting winding which prevents conduction of the device, so that no output pulse is transmitted from the circuit at this time. When the next operating pulse is applied to the circuit the core, being already set, is not affected thereby, so that no pulse is produced by the inhibiting winding to prevent the electronic device being rendered conductive by its receipt of this next operating pulse. The consequent conduction of the device causes an output pulse to be transmitted from the circuit, and also brings about the re-setting of the element core by virtue of the current flow produced through the inhibiting winding, so that at the termination of the second operating pulse the circuit has been restored to its original state.

In carrying out the invention operating (setting) pulses may conveniently be applied to the electronic device through a capacitive coupling which provides D.C. isolation between the input winding and inhibiting winding of the magnetic element. In this event, however, only the leading edge of an operating pulse is utilised to render the electronic device conductive at a time when the appropriate circuit condition obtains. In order therefore, to maintain conduction of the device for a time sufficient to produce an output pulse of requisite duration, there may be provided on the element core a further winding which is connected in the current path of the electronic device and is inductively coupled to the inhibiting winding to give a regenerative (positive) feedback action tending to prolong current flow through the electronic device.

In order that the invention may be more fully understood reference will now be made to the accompanying drawing in which:

FIG. 1 is a particular bi-stable circuit conforming to the invention;

FIG. 2 is an example of a binary counter having each of its stages constituted by a bi-stable circuit such as shown in FIG. 1; and FIG. 3 is an input circuit suitable for supplying operating pulses to the bi-stable circuit shown in FIG. 1.

Referring to FIG. 1, the bi-stable circuit includes a transistor T in conjunction with a ferrite ring core F having an input winding $iw$, an inhibiting winding $hw$ and a regenerative winding $rw$. The input winding $iw$ is connected at one end to a terminal $t$ to which positive-going operating pulses for the circuit will be applied, and at its other end by way of a resistance R to a negative supply terminal (—). The junction of the input winding $iw$ and the resistance R is coupled by way of a capacitor C to the emitter $e$ of the transistor T, this emitter $e$ being also connected to earth potential through the inhibiting winding $hw$ of the core. The regenerative winding $rw$ is connected between the transistor collector $c$ and the negative supply terminal (—) by way of a lead $l$ and a current-responsive utilising device UC. The base $b$ of the transistor T is connected directly to earth potential.

With the ferrite core F initially in its reset condition and the transistor T non-conductive since the base $b$ and emitter $e$ of the latter are at the same (earth) potential in the quiescent state, a positive-going operating pulse received by the input winding $iw$ from the input terminal $t$ will cause turnover of the core F to its set condition, causing production in the inhibiting winding $hw$ of a pulse which tends to take the potential of the transistor emitter $e$ negative with respect to the potential of its base $b$. The positive-going operating pulse is also applied through the capacitor C to the transistor emitter $e$ and thus tends to take the emitter potential positive with respect to the base potential. Consequently, by arranging the circuit parameters so that the positive and negative pulses which the emitter $e$ receives are substantially equal, the positive pulse, which by itself would render the transistor T conductive, is effectively cancelled by the negative pulse so that the transistor T remains non-conductive. When the next positive-going operating pulse is received by the input winding $iw$, the core F, being already turned over to its set condition by the previous setting pulse, is not affected and there is therefore no change in the state of core magnetisation such as to induce a pulse in the inhibiting winding $hw$ tending to take the transistor emitter $e$ negative. However, this second operating pulse, like the first, is applied across the capacitor C to the transistor emitter $e$, and this time, since there is no opposing negative pulse, the emitter potential is raised positively with respect to the base potential to bring the transistor T into conduction. The resulting current passed by the transistor T flows also through both the inhibiting winding $hw$ and the regenerative winding $rw$, which by virtue of inductive coupling therebetween provide a regenerative positive feedback action to prolong the current flow and thereby produce in the output lead $l$ an output pulse of duration which can be commensurate with that of an applied operating pulse. The flow of current through the inhibiting winding $hw$ is also of such polarity and magnitude as to cause turnover of the core back to its reset condition. The action is repeated for subsequent pairs of operating pulses and the circuit therefore provides an output pulse for every second operating pulse applied to it.

As shown in FIG. 2, the bi-stable circuit of the invention may be employed in a binary counter, each of a plurality of stage S1, S2 . . . S$n$ of the counter being constituted by such a circuit. For this particular application, the input winding $iw$ of the circuit of each stage (except the stage S1) is connected to the output lead $l$ of the circuit of the preceding stage to receive operating pulses therefrom at times when the transistor T in such preceding stage is rendered conductive. The pulses for counting are applied at terminal $tt$ as operating pulses to the input winding $iw$ of the first stage circuit S1, so that in conventional manner, each of the stages S1, S2 . . . S$n$ of the counter would be operated once for every two operations of the preceding stage and the respective states of the stages at any time would conform to a binary configuration representative of the number of pulses applied to the first stage S1. If desired the output lead $l$ of the last stage S$n$ of the counter may be connected to a load circuit L which would thus receive an output pulse each time the counter reaches its natural count.

Operating pulses for application to a bi-stable circuit of the invention may be supplied by an input circuit such as shown in FIG. 3; this input circuit may also be employed for the counter of FIG. 2 when pulses to be counted may not be fully suitable for direct application as operating pulses to the stage S1. The functions of the input circuit are to re-shape and amplify received pulses into a form more suitable for response by a magnetic element of the kind concerned and, to this end, the input circuit comprises a pulse-shaping element in the form of a blocking oscillator including a transistor T1, followed by an amplifying element including a transistor T2. The transistor T1 has its emitter $e1$ connected by way of a resistance $Rs1$ and a capacitor $Cc1$ to receive input pulses applied to an input terminal $t1$ for the circuit, while its base $b1$ is connected directly to earth, and its collector $c1$ is connected through a first winding $w1$ of a feedback transformer TX to the negative terminal (—) of an energising source for the input circuit. Suitably, the transformer TX may have a core formed of wound magnetic tape. The winding $w1$ is inductively coupled to a second winding $w2$ of the transformer TX, which winding $w2$ is connected at one side to the emitter $e1$ of the transformer T1, and at its other side through a resistance $Rs2$ to the negative terminal (—) and also through another resistance $Rs3$ to earth. The transformer TX also includes an output winding $w3$ which is inductively coupled to the winding $w1$ and is connected between earth and a resistance $Rs4$ through which it is connected to the base $b2$ of the transistor T2. The emitter $e2$ of the transistor T2 is connected directly to earth and its collector $c2$ is connected to an output terminal $t2$ for the circuit.

When a positive pulse is applied to the input terminal $t1$, the transistor T1 is brought into conduction and the resulting collector current in the winding $w1$ induces a negative pulse into the winding $w3$, thereby causing the transistor T2 to conduct. Thus, with the output terminal $t2$ connected to the input terminal $t$ of the bi-stable circuit of FIG. 1 for example, so that the collector $c2$ of transistor T2 is connected to the negative terminal (—) through the core input winding $iw$ and the resistance R, the conduction of the transistor T2 causes an operating pulse to appear in the winding $iw$. The resulting collector current of the transistor T1 also gives rise to positive feedback between the windings $w1$ and $w2$ so that the transistor T1 conducts still further, causing still further conduction of the transistor T2. This condition continues until saturation occurs, when the current gain of the transistor T1 has fallen to such a level that this transistor cannot maintain its increasing collector current; there then occurs a culminative decrease in the emitter current which switches off the transistor T1 and so terminates, by stopping conduction of the transistor T2, the operating pulse applied to the bi-stable circuit.

What I claim is:

1. A bistable circuit electrically operable between two stable states by successively applied operating pulses, comprising in operative combination: an operating pulse input terminal; an electronic device constituted by a transistor having emitter, collector and base electrodes; a static magnetic element having two stable states of magnetization and comprising a square-loop core of ferromagnetic material; an input winding magnetically linked with said core and connected to said input terminal in sense appropriate to the core being set to one of its stable states in response to an operating pulse applied to said terminal; an inhibiting winding magnetically linked with said core and connected in series with the transistor on the emitter electrode side thereof; a feedback winding magnetically linked with said core and connected in series with the transistor on the collector side thereof, said feedback winding being regeneratively coupled with the inhibiting winding; and a capacitor through which the emitter electrode of the transistor is connected to the input terminal through the input winding, the operating pulses being of such polarity as to tend to render the transistor conductive as applied to the emitter thereof through said input winding and capacitor; the inhibiting winding being connected in such sense that a pulse produced therein on setting of said core to its said one stable state opposes at the emitter electrode the operating pulse which caused the setting of the core, whereas on conduction of the transistor caused by an unopposed operating pulse the resulting current flow in the series-connected inhibiting winding causes the core to be reset to its other stable state.

2. A binary counter comprising a plurality of stages each of which is constituted by a bistable circuit conforming to claim 1, said input winding in the bistable circuit of each counter stage except the first being connected, by means of the pulse input terminal of the stage, in series with the feedback winding of the static magnetic element in the bistable circuit of the preceding counter stage, whereby to receive an operating pulse from said preceding stage when the transistor therein is rendered conductive.

3. In combination with a bistable circuit as claimed in claim 1, an input circuit comprising a blocking oscillator pulse shaping element for supplying shaped operating pulses to the bistable circuit, said element having an input terminal connected to receive input pulses and an output pulse terminal at which said shaped pulses appear in response to said input pulses, said output pulse terminal being connected to the operating pulse input terminal of the bistable circuit.

References Cited in the file of this patent
UNITED STATES PATENTS

| 2,763,780 | Skelton | Sept. 18, 1956 |
| 2,902,609 | Ostroff | Sept. 1, 1959 |
| 2,963,688 | Amemiya | Dec. 6, 1960 |